United States Patent [19]
Dyer

[11] Patent Number: 5,791,680
[45] Date of Patent: Aug. 11, 1998

[54] ATTACHMENT OF AIRBAG MODULE ASSEMBLY PROTECTIVE COVER

[75] Inventor: David J. Dyer, Kaysville, Utah

[73] Assignee: Autoliv ASP, Inc., Ogden, Utah

[21] Appl. No.: 764,653

[22] Filed: Dec. 4, 1996

[51] Int. Cl.$^6$ ................................................. B60R 21/20
[52] U.S. Cl. ................................. 280/728.3; 280/732
[58] Field of Search ........................ 280/728.2, 728.3, 280/732, 730.1, 730.2, 728.1

[56] References Cited

U.S. PATENT DOCUMENTS

| | | | |
|---|---|---|---|
| 4,234,035 | 11/1980 | Babbs | 160/392 |
| 4,404,962 | 9/1983 | Zinn et al. | 126/450 |
| 4,941,678 | 7/1990 | Lauritzen et al. | 280/732 |
| 5,181,354 | 1/1993 | Krueger et al. | 52/79.1 |
| 5,332,256 | 7/1994 | Lauritzen et al. | 280/728 A |
| 5,344,182 | 9/1994 | Lauritzen et al. | 280/728 A |
| 5,407,223 | 4/1995 | Lauritzen et al. | 280/728 A |
| 5,407,226 | 4/1995 | Lauritzen et al. | 280/728 R |
| 5,407,227 | 4/1995 | Lauritzen et al. | 280/728 R |
| 5,425,550 | 6/1995 | Paxton et al. | 280/728.3 |
| 5,431,436 | 7/1995 | Mossi et al. | 280/728.1 |
| 5,454,586 | 10/1995 | Rogerson | 280/728.2 |
| 5,460,400 | 10/1995 | Davidson | 280/728.2 |
| 5,470,105 | 11/1995 | Rose et al. | 280/740 |
| 5,474,323 | 12/1995 | Davidson | 280/728.2 |
| 5,474,325 | 12/1995 | Daines et al. | 280/728.3 |
| 5,480,182 | 1/1996 | Lauritzen et al. | 280/728.2 |
| 5,511,819 | 4/1996 | Spilker et al. | 280/728.2 |
| 5,566,975 | 10/1996 | Stull et al. | 280/732 |
| 5,647,608 | 7/1997 | Damman et al. | 280/728.2 |
| 5,676,393 | 10/1997 | Rose | 280/728.2 |

*Primary Examiner*—Peter C. English
*Attorney, Agent, or Firm*—Sally J. Brown

[57] ABSTRACT

An assembly and method are provided for the attachment of a protective cover to an airbag module assembly wherein the possibility of a portion of the folded airbag cushion extending over either of the sides of the reaction canister body and thus subject to being snagged or caught between the reaction canister body and the end plate upon attachment of the end plate(s) to the reaction canister body is avoided.

19 Claims, 3 Drawing Sheets

ATTACHMENT OF AIRBAG MODULE ASSEMBLY PROTECTIVE COVER

BACKGROUND OF THE INVENTION

This invention relates generally to inflatable restraint systems such as used to provide protection to vehicle occupants and, more particularly, to airbag module assemblies such as used in such systems.

Vehicular airbag module assemblies generally include as basic components: 1) an airbag cushion that is inflated with gas such as when the vehicle encounters a sudden deceleration, 2) an inflator which upon actuation serves to provide the gas used to inflate the airbag cushion, and 3) a reaction canister which typically functions as a structural housing supporting assembly components such as the inflator and the airbag cushion, for example, while providing a mounting base for installation of the assembly in a vehicle and direction to the inflation gases resulting from the inflator.

Emphasis on weight reduction in automobiles has created a need, and a demand, for lighter weight inflatable passive restraint systems. A significant reduction in the weight of such systems can be achieved through the utilization of lower weight materials such as aluminum or aluminum alloy, rather than comparatively heavy steel material, as used previously, for inflatable restraint system inflator and reaction canister structures.

Such airbag module assemblies and components are described in various prior patents, including commonly assigned U.S. Pat. Nos. 4,941,678; 5,332,256; 5,407,223; 5,407,226; 5,407,227; 5,431,436 and 5,480,182, for example.

In such airbag modules, the reaction canister is commonly in the form of an assembly which includes a trough-shaped body portion or part having an open top. As disclosed, such a trough-shaped body can be formed of an extruded material such as a polymer or a metal, such as aluminum, for example. The airbag cushion, typically in a collapsed and folded condition, is retained and supported by a retainer or diffuser within and near the top the reaction canister body. In conventional reaction canister assemblies, the ends of the reaction canister body part are closed by opposed end plates. Typically, one or more of the end plates include one or more openings for receiving and supporting a cylindrical inflation gas producing inflator device stored below the folded airbag cushion.

Typically, airbag cushions are stowed out of sight, thereby reducing the potential for intentional and unintentional tampering therewith. An airbag cushion for the protection of a front seat passenger, i.e., a passenger side airbag, is commonly mounted in a storage compartment behind the dashboard of the vehicle. A panel, formed either continuously or separately with the dashboard, provides closure to the opening in the dashboard wherethrough the airbag cushion will deploy when actuated. In general, the visual (i.e., "look") and tactile (i.e., "feel") properties of such closure panels are selected to match those of the associated dashboards, thereby minimizing the impression of the underlying airbag module assembly.

Oftentimes, airbag module assemblies include a protective cover overlying the folded airbag cushion stored within the reaction canister. Such a protective cover serves to close the open top of the reaction canister assembly. Thus, the protective cover helps to protect the airbag cushion from damage such as by accidental or other undesired contact such as by or with other elements of the inflatable restraint system as well as extraneous elements in the environment to which the airbag cushion can be exposed. Also, such a protective cover can desirably serve to keep debris out of the airbag module assembly.

In practice, such a protective cover is preferably fabricated of a tough, wear and normally tear resistant, material. Such protective covers can preferably be broken or ruptured at predetermined or selected sites in order to permit and facilitate desired deployment of an inflating airbag cushion therethrough. To facilitate opening of the protective cover, such covers are commonly pre-weakened, such as by perforating or reducing the thickness of the protective cover along such preformed tear lines, paths or seams, generally commonly referred to herein as "tear ways."

Such protective covers can be secured to the reaction canister and in the airbag module assembly by various means including: via an elastic band or other selected bead material placed about the outer edge of the protective cover (as disclosed in commonly assigned U.S. Pat. No. 5,566, 975); having the protective cover formed in one piece with the reaction canister body part (as disclosed in commonly assigned U.S. Pat. No. 5,431,436); and through the inclusion of flanges at the opposed ends of the protective cover, which flanges are adapted to be received within oppositely disposed grooves in the reaction canister (as disclosed in commonly assigned U.S. Pat. No. 5,511,819).

In the past, it has been common to secure one or more of the reaction canister end plates to the reaction canister body portion only after the airbag cushion has been joined to the assembly and folded and the protective cover applied and secured to the reaction canister. As prior to the attachment of the end plate, the folded airbag cushion may extend over the side of the reaction canister body, such an assembly process can unfortunately result in a portion of the airbag cushion being caught or snagged between the reaction canister body portion and the end plate.

Thus there is a demand and a need for an airbag module assembly and method of assembling an airbag module which permits the protective cover to be applied after the reaction canister end plates have been secured to the reaction canister body portion and after the airbag cushion has been folded.

SUMMARY OF THE INVENTION

A general object of the invention is to provide an improved airbag module assembly.

A more specific objective of the invention is to overcome one or more of the problems described above.

The general object of the invention can be attained, at least in part, through an airbag module assembly that includes a reaction canister, a protective cover, and a locking insert. The reaction canister has first and second opposite protective cover attachment channels which are spaced apart to define an airbag cushion storage cavity. The protective cover is in the general form of a body with opposed first and second side edges thicker than the protective cover body. The first side edge of the protective cover is slidably insertable into and retained within the first protective cover attachment channel of the reaction canister. The locking insert is slidably insertable into and retained within the second protective cover attachment channel of the reaction canister. The locking insert defines a channel with the second side edge of the protective cover slidably insertable into and retained within the locking insert channel.

The prior art fails to provide an airbag module assembly which permits a protective cover, as described above, to be applied after each of opposed first and second reaction canister end plates has been secured to the reaction canister body portion and after the airbag cushion has been folded in place, thereby avoiding snagging of the airbag cushion such as may occur upon attachment of the second, i.e., final, end plate to the reaction canister body portion.

The invention further comprehends an airbag module assembly that includes a one-piece extruded reaction canister body, a flexible protective cover, and a locking insert.

The reaction canister body has first and second opposite protective cover attachment channels spaced apart to define an airbag cushion storage cavity. Each of the first and second protective cover attachment channels are substantially circular in cross section with the second protective cover attachment channel having an internal diameter which is larger than the internal diameter of the first protective cover attachment channel.

The flexible protective cover is in the general form of a substantially rectangular, planar body. The protective cover includes opposed first and second side edges of substantially circular cross section. The first and second side edges are substantially coplanar with the protective cover body, with the first side edge slidably inserted into and retained within the first protective cover attachment channel of the reaction canister body.

The locking insert is slidably inserted into and retained within the second protective cover attachment channel of the reaction canister body. The locking insert defines a channel with the second side edge of the cover slidably inserted into and retained within the locking insert channel.

The invention still further comprehends a method of assembling an airbag module. The airbag module assembly includes a reaction canister assembly that defines an airbag cushion storage cavity. The reaction canister assembly includes a trough-shaped reaction canister body having first and second opposite, spaced apart, protective cover attachment channels and first and second opposite ends. The reaction canister assembly also includes first and second end closures for attachment to a respectively associated opposite end of the reaction canister body.

The airbag module assembly includes an airbag cushion securable to the reaction canister assembly, with the airbag cushion housed within the airbag storage cavity of the reaction canister assembly.

The airbag module assembly further includes a flexible protective cover for spanning the airbag cushion storage cavity between the first and second opposite protective cover attachment channels. The protective cover includes a body having opposed first and second side edges. The first and second side edges of the protective cover are thicker than the protective cover body, with the first side edge slidably insertable into and retained within the first protective cover attachment channel.

The assembly still further includes a locking insert slidably insertable into and retained within the second protective cover attachment channel. The locking insert defines a channel with the second side edge of the protective cover slidably insertable into and retained within the locking insert channel.

After the first end closure has been secured to the first end of the reaction canister body and the airbag cushion has been attached to the reaction canister body, the method of assembly includes the steps of:

a) inserting the first side edge of the protective cover within the first protective cover attachment channel of the reaction canister body, b) attaching the second end closure to the second end of the reaction canister body, c) folding the airbag cushion within the airbag storage cavity, d) inserting the second side edge of the protective cover into the second protective cover attachment channel of the reaction canister body, and e) inserting the locking insert into the second protective cover attachment channel of the reaction canister body with the second side edge slidably inserted into and retained within the channel of the locking insert.

As used herein, references to "extrusion" and "conventional extrusion" are to be understood to delineate from impact processing. Specifically, extrusion generally refers to a fundamental processing operation in many industries in which a material is forced through a metal forming die, followed by cooling or chemical hardening. In contrast, in impact processing, a part is formed in a confining die from a metal slug, usually cold, by a single stroke application of force through a punch causing the metal to flow around the punch. While impacts are suited for the making of hollow parts that have one end totally closed, an extrusion rather than an impact is better suited for the formation of a tubular outside wall with open ends, such as described later herein.

Other objects and advantages will be apparent to those skilled in the art from the following detailed description taken in conjunction with the appended claims and drawings.

DETAILED DESCRIPTION OF THE INVENTION

Figure 1:
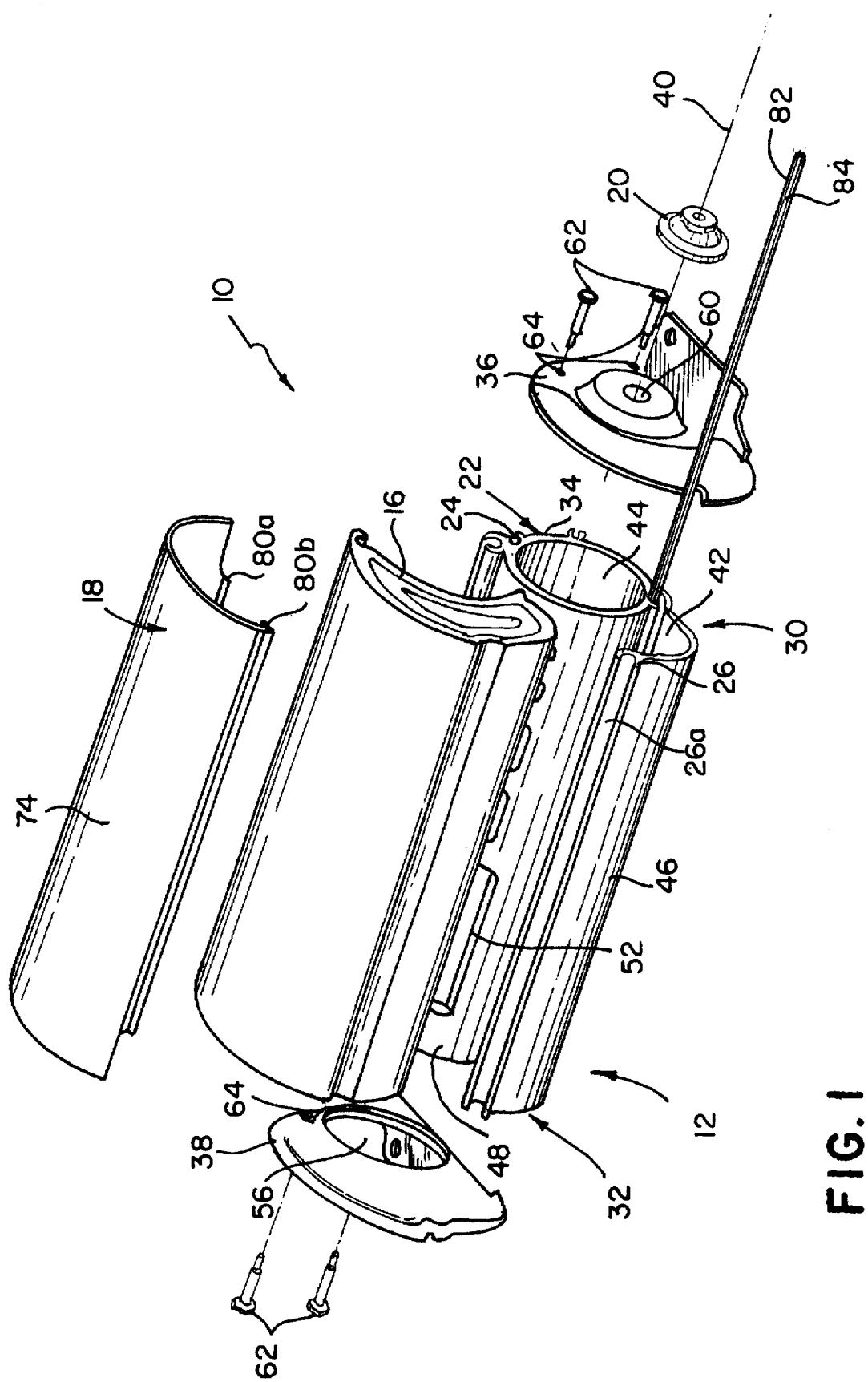
FIG. 1 is a simplified, exploded perspective view of an airbag module assembly in accordance with one embodiment of the invention.
Figure 2:
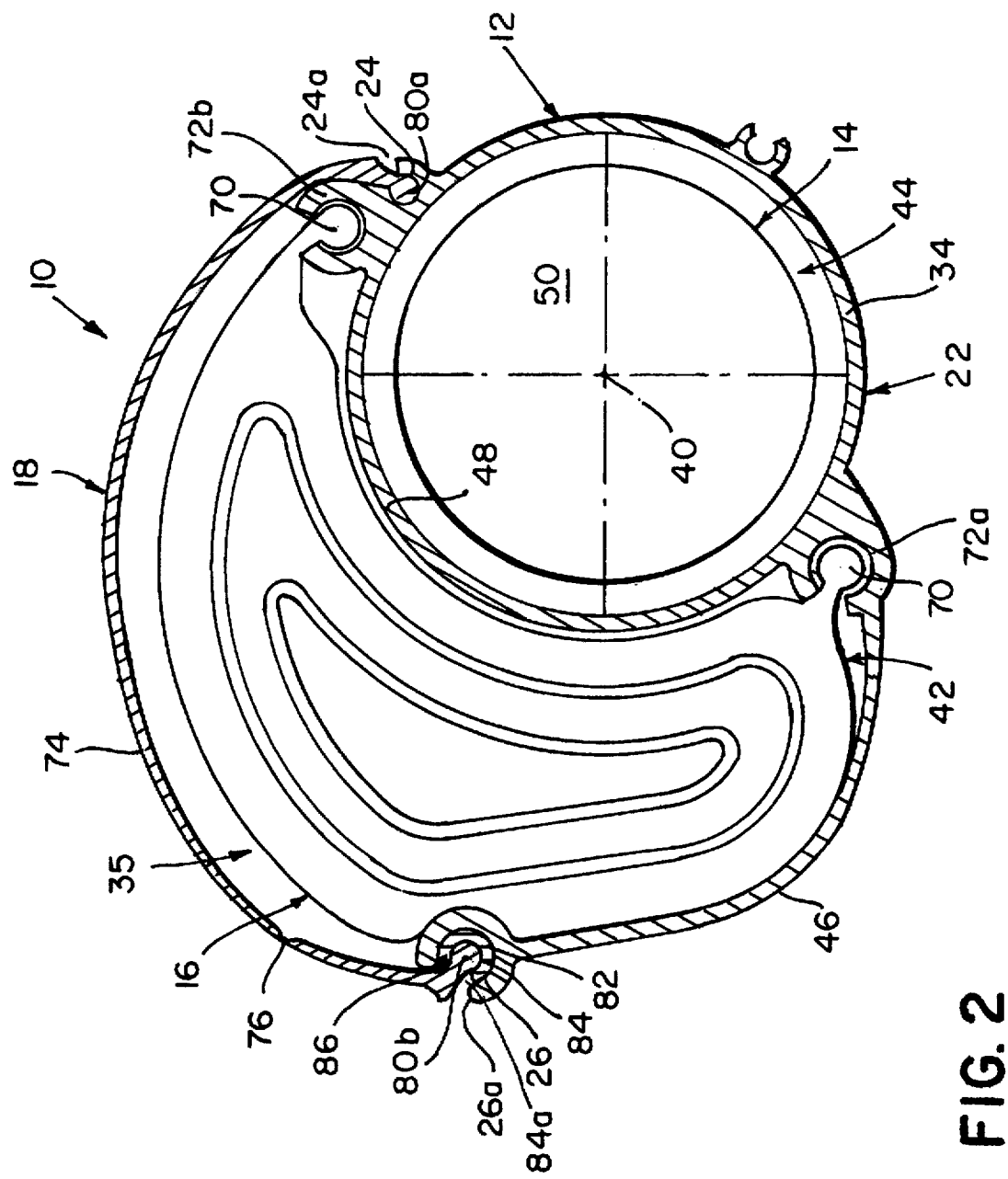
FIG. 2 is a simplified, partially in section view of the airbag module assembly of FIG. 1, also showing the inclusion of the airbag inflator.

The present invention, as described in greater detail below, provides an improved airbag module assembly for use in an inflatable restraint system such as used to provide protection to vehicle occupants. Referring to the drawings and initially referring particularly to FIGS. 1 and 2, there is illustrated an airbag module assembly, generally designated by the reference numeral 10.

It is to be understood that in the practice of the invention, such an airbag module assembly is commonly housed in or secured to any appropriate cooperating portion of an associated vehicle (not shown). In the case of a passenger side module installation, such an assembly is normally housed in or behind the dashboard of the vehicle opposite the passenger seat. It will be appreciated that for such an installation, a closure panel (not shown), typically formed either continuously or separately with the dashboard, as described above, provides closure to the dashboard opening wherethrough the airbag cushion will deploy when actuated.

The assembly 10 includes a reaction canister assembly 12, an inflatable restraint system inflator 14 (shown in FIG. 2 but not shown in FIG. 1 in order to facilitate illustration and comprehension), an airbag cushion 16, a protective cover 18, and a nut to further secure the inflator 14 within the reaction canister assembly 12.

The reaction canister assembly 12 is an inflatable restraint system subassembly which includes a reaction canister body 22, such as formed as a one piece construction by means of conventional extrusion of a light weight material such as a relatively light weight metal such as aluminum or magnesium, for example. The reaction canister body 22 has the general form of a long, narrow, open receptacle or trough and includes first and second opposite protective cover attachment channels, 24 and 26, respectively, and first and second opposite ends, 30 and 32, respectively.

Each of the protective cover attachment channels, 24 and 26, respectively, is substantially circular in cross section having a generally C-shaped cross sectional configuration and each has a mouth 24a and 26a, respectively. In the illustrated embodiment, the second protective cover attachment channel 26 has a larger internal diameter than the first protective cover attachment channel 24. The utilization of such a larger diameter protective cover attachment channel will be described in greater detail below.

The protective cover attachment channels 24 and 26 are generally spaced apart and joined together by way of a reaction canister body bridging base portion 34, described in greater detail below. The spaced apart attachment channels 24 and 26 also define an open top 35 in the reaction canister assembly 12. As will be described in greater detail below and in accordance with the invention, the open top 35 is spanned and closed by the protective cover 18.

The reaction canister assembly 12 also includes two end plates, a first end plate longitudinally between the end plates 36 and 38. The end plates 36 and 38 are located at opposite axial ends 30 and 32, respectively, of the reaction canister body 22.

The reaction canister body 22 and the end plates 36 and 38 together define an collapsed and typically folded state, as is known in the art. The reaction canister body 22 and the end plates 36 and 38 together also define an inflator storage housing 44 for housing or storing the inflator 14. Such a reaction canister structure provides protection for the inflator 14 and the airbag cushion 16 until the time of deployment of the airbag cushion and also acts to absorb the loads generated upon such deployment. Typically, these loads are large and unless sufficiently absorbed can cause damage to the vehicle including, in the case of a passenger side assembly, damage to the dashboard panel.

As shown and as generally preferred, at least one of the protective cover and joined to the reaction canister bridging base portion 34 by means of an extending sidewall 46. It will be appreciated that the spacing of at least one of the protective cover attachment channels from the reaction canister bridging base portion by means of such an extending sidewall facilitates the formation of a storage volume for storage of the airbag cushion adjacent the inflator housing, as such a compact assembly will generally minimize space requirements. It is to be further appreciated that, if desired, each of the oppositely spaced protective cover attachment channels can be spaced from and joined to the reaction canister bridging base portion by means of a similar such extending sidewall in order to provide an airbag cushion storage volume having a size and geometric shape suited for particular airbag module installations.

The bridging base portion 34 of the illustrated reaction canister body 22 is generally in the form of a continuous circumference tubular diffuser 48 wherein the chamber tube portion 50 of the inflator 14 is held in coaxial relation. Such a continuous circumference diffuser is specifically described in commonly assigned and herein fully incorporated U.S. Pat. No. 5,332,256, issued Jul. 26, 1994.

It is to be appreciated that, in accordance with the invention, the reaction canister body can be variously sized and shaped, as desired, and need not be shaped as a generally continuous circular cross sectional shape diffuser. For example, the reaction canister body could, if desired, be sized and shaped in the form of an inflator holder of partial, generally circular cross section extending less than 360° such as shown and described in commonly assigned and herein fully incorporated U.S. Pat. No. 5,407,226, issued Apr. 18, 1995.

By the nature of such a tubular diffuser 48 being in surrounding relation with the inflator 14 disposed therein, the inflator can, as desired, be either a thrust neutral inflator (wherein the inflator includes gas discharge openings positioned such that the gas is discharged in opposing directions whereby there are no resulting forces tending to cause physical movement of the inflator and hence, the inflator will expend the energy generated thereby, generally in place) or a directional inflator.

The tubular diffuser 48 includes a generally cylindrical wall having spaced inflation gas exit ports or slots 52 provided therein and facing the adjoining airbag cushion 16.

In order to allow the inflator 14 to be inserted into the diffuser 48 as a last operation in the assembly process, a circular opening 56 is provided in the end plate 38 at a location generally centered on the axis 40. A smaller fastener opening 60 is provided in the end plate 36. The fastener opening 60 is also generally disposed on the axis 40. The size of the fastener opening 60 is such as to snugly receive a stud (not shown) projecting from the end of the inflator 14. The nut 20 is then placed on the stud so as to further secure the inflator 14 within the reaction canister assembly 12.

The end plates 36 and 38 are secured to opposite ends 30 and 32, respectively, of the reaction canister body 22 such as by means of fasteners 62 which are passed through corresponding fastener holes 64 in the end plates 36 and 38.

The airbag cushion 16 is also appropriately secured to and within the reaction canister assembly 12. As perhaps best viewed in FIG. 2, the airbag cushion 16 has a thickened peripheral edge 70. Such thickening of an air bag cushion is shown and described in commonly assigned U.S. Pat. No. 5,344,182, issued Sept. 6, 1994 and U.S. Pat. No. 5,470,105, issued Nov. 28, 1995, the disclosures of which patents are fully incorporated herein by reference. As disclosed in these patents, such thickening of an airbag cushion can take the form of a hemmed loop of airbag material at the gas inlet opening edge of the airbag cushion and into which loop, a selected bead material (not shown) is placed to better ensure positive engagement of the airbag cushion into the assembly.

The reaction canister assembly 12, here specifically the reaction canister body 22, includes means such as airbag cushion attachment channels 72a and 72b wherein the thickened peripheral edge 70 of the airbag cushion 16 can be secured such as in a manner known in the art.

The inflator 14 is generally longitudinally coaxially aligned within the continuous circumference diffuser tube 48 and in spaced relation therewith whereby contact by the inflator 14 with the diffuser tube 48 is avoided. By maintaining the inflator in spaced relation with the reaction canister diffuser tube wall, a gas flow path between the inflator 14 and the diffuser tube 48 is provided wherethrough the gaseous output from the inflator can be passed. It will be appreciated that undesired contact between an inflator and an associated reaction canister wall can obstruct or result in unbalanced gas flow from the reaction canister to the associated airbag cushion and thus result in problems such as undesired airbag cushion deployment geometries.

As identified above, the airbag module assembly 10 includes the protective cover 18. As with the above-described protective covers, in the completed assembly 10, the protective cover 18 overlies the airbag cushion 16 stored within the reaction canister assembly 12. The protective cover 18 serves to close the open top 35 of the reaction canister assembly 12. Thus, the protective cover 18 helps to protect the airbag cushion 16 from damage such as by accidental or other undesired contact such as by or with other elements of the inflatable restraint system as well as extraneous elements in the environment to which the airbag cushion can be exposed. Also, such a protective cover can desirably serve to keep debris out of the airbag module assembly.

While such a protective cover can be fabricated of various materials, in practice it is preferable that the protective cover be fabricated of a tough, wear and normally tear resistant material, such as a thermoplastic olefin (commonly referred to in the industry as "TPO").

The protective cover 18 has the general form of a substantially rectangular body 74. The protective cover body 74 includes a tear seam 76 (seen in FIG. 2) of reduced thickness whereby when pressure is applied against the protective cover 18, such as by way of the airbag cushion 16 inflating thereagainst, the protective cover 18 is opened to permit the airbag cushion 16 to deploy therethrough. It will be appreciated that other appropriate means of opening or facilitating opening of the protective cover may be selected and utilized as the invention in its broader aspects is not limited by the means by which the protective cover is opened.

The protective cover 18 includes first and second opposed side edges 80a and 80b, respectively. In the illustrated embodiment, the side edges 80a and 80b each are substantially circular in cross section. It will be appreciated, however, that the invention in its broader aspects is not limited to side edges of such cross sectional shape and that the invention contemplates that side edges of other appropriate shape can and will be utilized in other particular assemblies.

The side edges 80a and 80b are generally thicker than the protective cover body 74. The first side edge 80a is sized and shaped to permit the first side edge 80a to be slidably axially inserted into the first protective cover attachment channel 24. Further, the first side edge 80a is sized and shaped such that the first side edge 80a is radially retained within the first protective cover attachment channel 24, e.g., the first side edge is incapable of normally being withdrawn through the mouth 24a of the first protective cover attachment channel. More specifically, the first side edge 80a is normally incapable of being withdrawn through the mouth 24a of the first protective cover attachment channel 24 without damage to either or both the cover and the reaction canister body.

Figure 3:
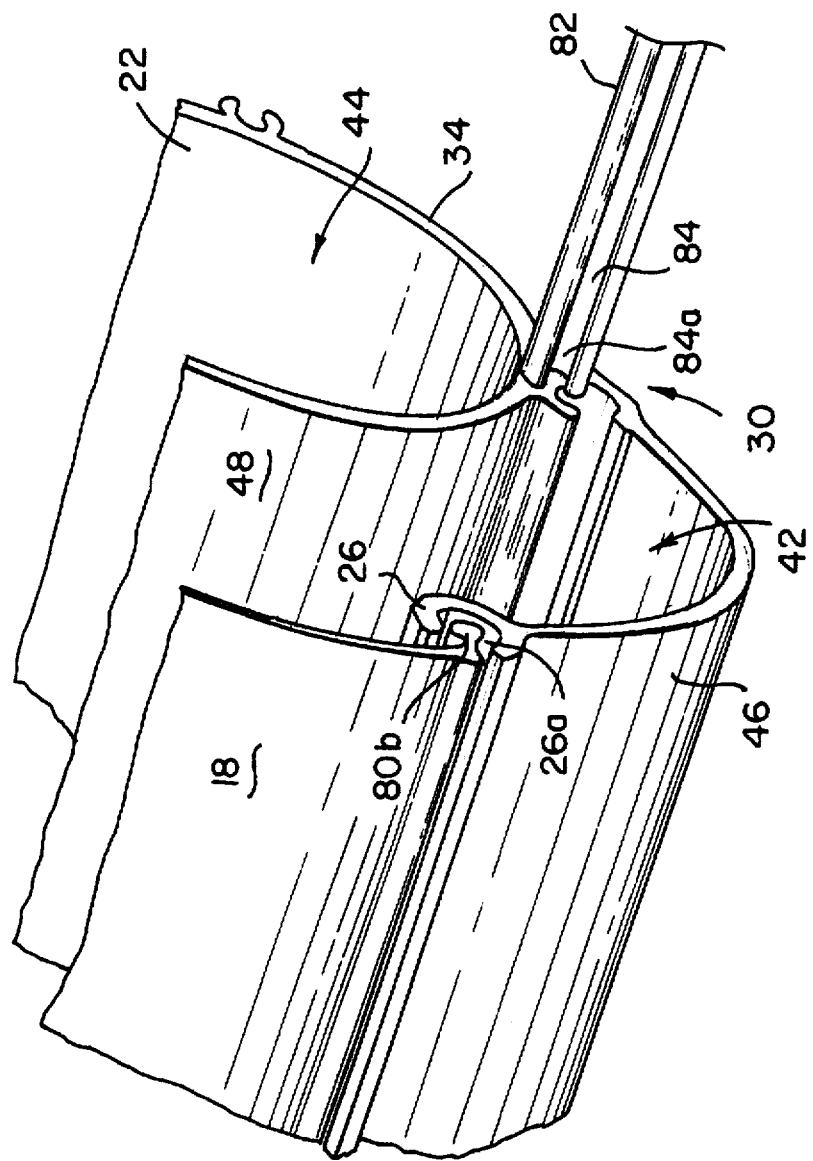
FIG. 3 is an enlarged, simplified, partially exploded fragmentary perspective view showing the attachment of the reaction canister body part, the cover and the locking insert of the airbag module assembly of FIG. 1.

As shown in FIG. 3, the second side edge 80b of the protective cover 18 is sized and shaped to permit the second side edge 80b to be radially inserted through the mouth 26a of the second protective cover attachment channel 26. It will be appreciated that, if desired, such second side edge 80b could alternatively be longitudinally inserted into the second protective cover attachment channel 26.

The airbag module assembly 10 also includes a longitudinally extending locking insert 82 which includes a "C-shaped" cross sectional configuration channel 84, having a mouth 84a.

As shown in the figures and as perhaps best viewed in FIG. 3, the locking insert 82 is sized and shaped to permit the locking insert 82 to be slidably axially inserted into the second protective cover attachment channel 26. The locking insert channel 84 and the second side edge 80b are also sized and shaped to permit the second side edge 80b to be slidably axially inserted into the locking insert channel 84, such as after the longitudinally extending second side edge 80b has been inserted into the longitudinally extending second protective cover attachment channel 26, to form a protective cover and locking insert combination 86. For example, such slidable insertion can be realized by sliding the locking insert channel 84 over the second side edge 80b. It will be appreciated that the larger internal diameter provided by the second protective cover attachment channel 26, as compared to that of the first protective cover attachment channel 24, can facilitate the formation of the combination 86.

Further, the locking insert channel 84 and the second side edge 80b are generally sized and shaped to radially retain the second side edge 80b within the locking insert channel 84, e.g., the second side edge 80b is incapable of normally being withdrawn through the locking insert channel mouth 84a such that the protective cover and locking insert combination 86 is radially retained within the second protective cover attachment channel 26, e.g., the combination 86 is incapable of normally being withdrawn through the protective cover channel mouth 26a.

It will be appreciated that the above-described airbag module assembly 10 permits the protective cover 18 to be applied after the reaction canister end plates 36 and 38 have been secured to the reaction canister body portion 22 and after the airbag cushion 16 has been folded.

More specifically, after the steps of securing of the first end closure 36 to the first end 30 of the reaction canister body 22 and attaching the airbag cushion 16 to the reaction canister assembly 12, specifically the reaction canister body 22, such as in a manner known in the art, and either of which securing and attaching steps can precede the other, one such method of assembly involves the following steps:

a. inserting the protective cover first side edge 80a within the reaction canister body first protective cover attachment channel 24;

b. attaching the second end closure 38 to the second end 32 of the reaction canister body 22;

c. folding the airbag cushion 16, such as in a manner known in the art, within the airbag cushion storage cavity 42;

d. inserting the protective cover second side edge 80b into the reaction canister body second protective cover attachment channel 26; and e. inserting the locking insert 82 into the reaction canister body second protective cover attachment channel 26 with the protective cover second side edge 80b slidably inserted into and retained within the locking insert channel 84.

In a preferred method of assembly in accordance with the invention, the above recited steps a-e occur in that sequence, e.g., step a followed by step b, which in turn is followed by step c, which is followed by step d, and which is followed by step e.

Thus, the invention provides a simple and reliable assembly and method of assembly whereby the possibility of a portion of the folded airbag cushion extending over either of the sides of the reaction canister body and thus subject to being snagged or caught between the reaction canister body and the end plate upon attachment of the end plate(s) to the reaction canister body is avoided.

While the invention has been described hereinabove with particular reference to a passenger side airbag module assembly for automotive vehicles including vans, pick-up trucks, and particularly automobiles, it is to be understood that the invention also has applicability not only with other types or kinds of vehicles including, for example, airplanes, but also can, if desired, be used with other types or kinds of airbag module assemblies for automotive vehicles including, for example, side impact and driver side assemblies.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An airbag module assembly comprising:
    a reaction canister having first and second opposite protective cover attachment channels spaced apart to define an airbag cushion storage cavity,
    a protective cover in the form of a body with opposed first and second side edges thicker than the protective cover body, with the first side edge slidably insertable into and retained in engagement with the first protective cover attachment channel, and
    a locking insert slidably inserted into and retained within the second protective cover attachment channel, said locking insert defining a channel with the second side edge slidably insertable into and retained within the locking insert channel.

2. The airbag module assembly of claim 1 wherein said reaction canister comprises a reaction canister body portion including the first and second opposite spaced apart cover attachment channels and first and second opposite ends, and first and second end closures for attachment to the first and second ends, respectively, of the reaction canister body portion.

3. The airbag module assembly of claim 2 wherein the reaction canister body portion is formed by extrusion fabrication.

4. The airbag module assembly of claim 2 wherein the reaction canister body portion has the form of a tubular diffuser.

5. The airbag module assembly of claim 1 wherein said reaction canister includes a bridging base portion and has at least one of the first and second opposite protective cover attachment channels spaced from and joined to the reaction canister bridging base portion by means of an extending sidewall.

6. The airbag module assembly of claim 1 wherein the locking insert channel has a C-shaped cross sectional configuration.

7. An airbag module assembly comprising:
    a reaction canister having first and second opposite protective cover attachment channels spaced apart to define an airbag cushion storage cavity,
    a protective cover in the form of a body with opposed first and second side edges thicker than the protective cover body, with the first side edge slidably insertable into and retained within the first protective cover attachment channel, and
    a locking insert slidably inserted into and retained within the second protective cover attachment channel, said locking insert defining a channel with the second side edge slidably insertable into and retained within the locking insert channel,
    wherein each of the first and second protective cover attachment channels is substantially circular in cross section with the second protective cover attachment channel having a larger internal diameter than the first protective cover attachment channel.

8. The airbag module assembly of claim 7 wherein the first protective cover attachment channel includes a mouth sized to prevent radial passage of the first side edge therethrough.

9. The airbag module assembly of claim 7 wherein the second protective cover attachment channel includes a mouth sized to permit the second side edge to be radially inserted therethrough.

10. The airbag module assembly of claim 9 wherein said locking insert with the second side edge inserted into the locking insert channel forms a combination, with the mouth of the second protective cover attachment channel sized to prevent radial passage of the combination therethrough.

11. An airbag module assembly comprising:
    a one-piece extruded reaction canister body having first and second opposite protective cover attachment channels spaced apart to define an airbag cushion storage cavity, each of the first and second protective cover attachment channels being substantially circular in cross section with the second protective cover attachment channel having a larger internal diameter than the first protective cover attachment channel,
    a flexible protective cover in the form of a substantially rectangular body having opposed first and second side edges of substantially circular cross section, with the first side edge slidably inserted into and retained within the first protective cover attachment channel, and
    a locking insert slidably inserted into and retained within the second protective cover attachment channel, said locking insert defining a channel with the second side edge slidably inserted into and retained within the locking insert channel.

12. The airbag module assembly of claim 11 wherein said locking insert channel has a C-shaped cross sectional configuration.

13. The airbag module assembly of claim 11 wherein the reaction canister body has the form of a tubular diffuser.

14. The airbag module assembly of claim 11 wherein said reaction canister body includes a bridging base portion and has at least one of the first and second opposite protective cover attachment channels spaced from and joined to the reaction canister bridging base portion by means of an extending sidewall.

15. In the assembling of an airbag module comprising:
    a reaction canister assembly defining an airbag cushion storage cavity, the reaction canister assembly including;
    a trough-shaped reaction canister body having first and second opposite spaced apart protective cover attachment channels and first and second opposite ends, and
    first and second end closures for attachment to the first and second ends respectively of the reaction canister body;
    an airbag cushion securable to the reaction canister assembly and housed within the airbag cushion storage cavity,
    a flexible protective cover for spanning the airbag cushion storage cavity between the first and second opposite protective cover attachment channels, the protective cover having a body with opposed first and second side edges thicker than the protective cover body, with the first side edge slidably insertable into and retained within the first protective cover attachment channel, and a locking insert slidably insertable into and retained within the second protective cover attachment channel, the locking insert defining a channel with the second side edge slidably insertable into and retained within the locking insert channel, and wherein the first end closure has been secured to the first end of the reaction canister body and the airbag cushion has been attached to the reaction canister body, the steps of:

inserting the first side edge within the first protective cover attachment channel of the reaction canister body, attaching the second end closure to the second end of the reaction canister body, folding the airbag cushion within the airbag storage cavity, inserting the second side edge into the second protective cover attachment channel of the reaction canister body, and inserting the locking insert into the second channel of the reaction canister body with the second cover side edge slidably inserted into and retained within the locking insert channel.

16. The method of claim 15 wherein said steps of inserting the first side edge, attaching the second end closure, folding the airbag cushion, inserting the second side edge and inserting the locking insert occur in that sequence.

17. The method of claim 15 wherein the first side edge is slidably inserted within the first protective cover attachment channel of the reaction canister body.

18. The method of claim 15 wherein the second protective cover attachment channel of the reaction canister body forms a mouth and said inserting of the second side edge into the second protective cover attachment channel of the reaction canister body comprises passing the second side edge radially through the mouth of the second protective cover attachment channel.

19. The method of claim 18 wherein the first side edge is slidably inserted within the first protective cover attachment channel of the reaction canister.

* * * * *